United States Patent Office 3,257,443
Patented June 21, 1966

3,257,443
ESTERS OF BENZOIC ACID HAVING AT LEAST ONE RADICAL
Sumio Umezawa and Tatsuo Tomioka, Tokyo, Toshio Nakamura, Oomiya, and Yasuo Hoshiide, Okegawamachi, Saitama, Japan, assignors to Nikken Chemicals Co., Ltd., Tokyo, Japan, a corporation of Japan
No Drawing. Filed July 10, 1962, Ser. No. 208,943
Claims priority, application Japan, July 10, 1961, 36/24,660
3 Claims. (Cl. 260—463)

The present invention relates to new esters of benzoic acid having at least one radical and especially to 4-(N,N-diethylamino)-butanol and 6-(N,N-diethylamino)-hexanol esters of benzoic acid having at least one radical, acid-addition salts thereof, quaternary ammonium salts thereof. The esters of the present invention are comprehended by the general formula:

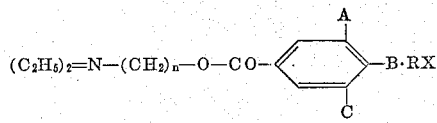

wherein A and C represent respectively a hydrogen atom or a methoxy radical, B represents a hydrogen atom, a methoxy or carboethoxyoxy radical of the formula

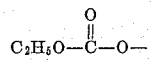

the total number of methoxy radicals is at most 2, a case where A, B, and C are all hydrogen atom is excluded, $n$ represents 4 or 6, R represents a hydrogen atom or a lower alkyl radical, and X represents a halogen atom.

One of the objects of the present invention is to produce a new class of valuable chemical compounds useful as hypotensive agents.

Other objects, features and advantages of the present invention will become apparent from the following description.

The compounds of the present invention which have not been reported may be used medically in the form of water-soluble addition salts of hydrochloric acid or quaternary ammonium salt. These compounds have significant lowering action of blood pressure and are therapeutically valuable hypotensive agents.

In the practice of the present invention, an aracyl chloride comprehended by the general formula:

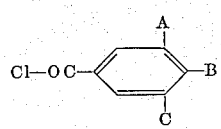

wherein A, B, and C are each as hereinbefore defined, is reacted with an alcohol comprehended by the general formula:

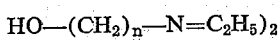

wherein $n$ is as hereinbefore defined, to produce the desired ester. The reactions are carried out in inactive organic solvents such as benzene in the manner of allowing to stand at room temperature for a long time or heating for a short time. Thus, the desired ester is obtained in the form of a salt of hydrochloric acid. In order to convert this salt to the quaternary ammonium salt, hydrogen chloride is removed from the salt with silver carbonate and the resulting free base is reacted with halogen alkyl in the inactive organic solvent such as ethyl acetate.

The invention is further described in the following examples which are illustrative and not limitative thereof.

Example 1

Instance of 4-(N,N-diethylamino)-butyl p-methoxy-benzoate:

A solution of 2.5 grms. of p-methoxy-benzoyl chloride and 2.12 grms. of 4-(N,N-diethylamino)-butanol in dry benzene was allowed to stand at room temperature for 2 days or heated for 3 hours. The hydrochloride of the desired ester separated out as a crystalline precipitate (4.12 grms., 89.2%), which was filtered off and recrystallized from acetone-petroleum benzine mixture in the form of white needles having M.P. 120.0 to 121.5° C.

*Analysis.*—$C_{16}H_{26}O_3NCl$: Calculated—C, 60.87; H, 8.30; N, 4.43. Found—C, 61.42; H, 8.62; N, 4.59.

In order to convert this salt to the free base of the ester, 4.12 grms. of the hydrochloride of the ester dissolved in methanol and an excessive quantity of silver carbonate were violently stirred for 20 minutes. On filtering off the inorganic salts, distilling off the methanol from the filtrate and purifying the residue from column-chromatography with activated aluminum oxide, there was obtained the free base of the ester (2.83 grms., 77.1%) as colorless oil having $N_D^{29.5}$ 1.5039.

In order to convert this free base to the methyl iodide derivative of the ester, a solution of 1.55 grms. of the free base and excessive quantity of iodomethyl in ethyl acetate was allowed to stand at room temperature for 2 days or warmed for a short time at 60° C. The methyl iodide derivative of the ester separated out as a crystalline precipitate (2.24 grms., 95.8%), which was filtered off and recrystallized from alcohol in the form of yellowish white needles having M.P. 147.5 to 148.4° C.

*Analysis.*—$C_{17}H_{28}O_3NI$: Calculated—C, 48.47; H, 6.70; N, 3.33. Found—C, 48.97; H, 6.60; N, 3.73.

In order to convert the free base to the methyl bromide derivative of the ester, 1.40 grms. of the free base and excessive quantity of bromomethyl were reacted in ethyl acetate in the manner described above. The separated crystalline precipitate (1.83 grms., 97.5%) of the methyl bromide derivative of the ester was filtered off and recrystallized from alcohol-petroleum benzine mixture in the form of white needles having M.P. 178.5 to 179.1° C.

*Analysis.*—$C_{17}H_{28}O_3NBr$: Calculated—C, 54.55; H, 7.54; N, 3.74. Found—C, 54.53; H, 7.64; N, 3.97.

Example 2

Instance of 4-(N,N-diethylamino)-butyl m,p-dimethoxy-benzoate:

The hydrochloride of this compound was prepared in 63.8% yield in the same manner as that of Example 1, except that m,p-dimethoxy-benzoyl chloride was used instead of p-methoxy-benzoyl chloride. The hydrochloride thus prepared was recrystallized from acetone-petroleum benzine mixture in the form of white plates having M.P. 153.4 to 154.0° C.

*Analysis.*—$C_{17}H_{28}O_4NCl$: Calculated—C, 59.03. H, 8.16; N, 4.05. Found—C, 59.00; H, 8.23; N, 3.94.

Example 3

Instance of 4-(N,N-diethylamino)-butyl p-carboethoxy-oxy-benzoate:

The hydrochloride of this compound was prepared in 63.8% yield in the same manner as that of Example 1, except that p-carboethoxyoxy-benzoyl chloride was used instead of p-methoxy-benzoyl chloride. The thus-obtained hydrochloride was recrystallized from ethyl-acetate-petroleum benzine mixture in he form of white crystals having M.P. 87.0 to 90.0° C. The product was hygroscopic..

*Analysis.*—$C_{18}H_{28}O_5NCl$: Calculated—C, 57.82; H, 7.55; N, 3.75. Found: C, 57.95; H, 7.60; N, 4.02.

The corresponding free base was prepared from the hydrochloride of the ester, in 67.5% yield as colorless oil having $N_D^{24.5}$ 1.4889 in the same manner as that of Example 1.

The corresponding methyl iodide derivative was prepared from the free base of the ester and iodomethyl in 93.3% yield in the same manner as that of Example 1. The derivative thus obtained was recrystallized from alcohol-petroleum benzine mixture in the form of yellowish white needle having M.P. 171.4 to 171.5° C. (decomp.).

Analysis.—$C_{19}H_{30}O_5NI$: Calculated—C, 47.60; H, 6.31; N, 2.92. Found—C, 48.06; H, 6.43; N, 2.72.

The corresponding methyl bromide derivative was prepared from the free base of the ester and bromomethyl in 96.0% yield in the same manner as that of Example 1. The derivative thus prepared was recrystallized from alcohol in the form of white plates having M.P. 169.2° C. (decomp.).

Analysis.—$C_{19}H_{30}O_5Br$: Calculated—C, 52.78; H, 6.99; N, 3.24. Found—C, 52.50; H, 6.77; N, 3.81.

Example 4

Instance of 4-(N,N-diethylamino)-butyl carboethoxy-syringate:

The hydrochloride of this compound was prepared in 77.9% yield in the same manner as that of Example 1, except that carboethoxy-syringoyl chloride was used instead of p-methoxy-benzoyl chloride. The thus-prepared hydrochloride was recrystallized from ethyl acetate-petroleum benzine mixture in the form of white needles having M.P. 124° C. (decomp.).

Analysis.—$C_{20}H_{32}O_7NCl$: Calculated—C, 55.36; H, 7.43; N, 3.23. Found—C, 55.47; H, 7.40; N, 3.45.

The corresponding free base was prepared from the hydrochloride of the ester in 99.0% yield as colorless oil having $N_D^{20}$ 1.4968 in the same manner as that of Example 1.

The corresponding methyl iodide derivative was prepared from the free base of the ester and iodomethyl in 79.4% yield in the same manner as that of Example 1. The derivative thus-prepared was recrystallized from alcohol-petroleum benzine mixture in the form of white plates having M.P. 130.5 to 130.8° C. (decomp.).

Analysis.—$C_{21}H_{34}O_7NI$: Calculated—C, 46.76; H, 6.35; N, 2.60. Found—C, 47.16; H, 6.09; N, 2.78.

The corresponding methyl bromide derivative was prepared from the free base of the ester and bromomethyl in 85.0% yield in the same manner as that of Example 1. The thus-prepared derivative was recrystallized from acetone-ethyl acetate mixture in the form of white plates having M.P. 110.0 to 112.5° C. (decomp.).

Analysis.—$C_{21}H_{34}O_7NBr$: Calculated—C, 51.22; H, 6.96; N, 2.84. Found—C, 51.36; H, 6.64; N, 3.27.

Example 5

Instance of 6-(N,N-diethylamino)-hexyl m-methoxy benzoate:

The hydrochloride of this compound was prepared in 99.0% yield in the same manner as that of Example 1, except that m-methoxy-benzoyl chloride and 6-(N,N-diethylamino)-hexanol were used instead of p-methoxy-benzoyl chloride and 4-(N,N-diethylamino)-butanol. The hydrochloride thus obtained was recrystallized from ethyl acetate in the form of white needles having M.P. 75.1 to 76.0° C. The product was hygroscopic.

Analysis.—$C_{18}H_{30}O_3NCl$: Calculated—C, 62.86; H, 8.79; N, 4.07. Found—C, 63.01; H, 8.72; N, 4.23.

The corresponding free base was prepared from the hydrochloride of the ester in 83.0% yield as colorless oil having $N_D^{11.5}$ 1.5033 in the same manner as that of Example 1.

The corresponding methyl bromide derivative was prepared from the free base of the ester and bromomethyl in 99.0% yield in the same manner as that of Example 1. The derivative thus obtained was recrystallized from acetone-petroleum benzine mixture in the form of white needles having M.P. 78.0 to 78.9° C.

Analysis.—$C_{19}H_{32}O_3NBr$: Calculated—C, 56.71; H, 8.01; N, 3.48. Found—C, 55.95; H, 7.84; N, 3.78.

Example 6

Instance of 6-(N,N-diethylamino)-hexyl p-methoxy benzoate:

The hydrochloride of this compound was prepared in 98.0% yield in the same manner as that of Example 1, except that 6-(N,N-diethylamino)-hexanol was used instead of 4-(N,N-diethylamino)-butanol. The hydrochloride thus obtained was recrystallized form acetone-petroleum benzine mixture in the form of white needles having M.P. 124.2 to 124.9° C.

Analysis.—$C_{18}H_{30}O_3NCl$: Calculated—C, 62.86; H, 8.79; N, 4.07. Found—C, 63.14; H, 8.54; N, 4.30.

What is claimed is:

1. A compound of the formula

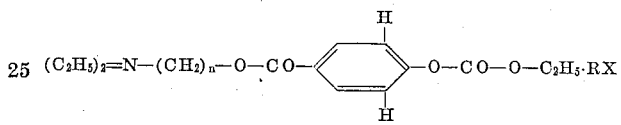

wherein n is either 4 or 6 and X represents a halogen atom, while R is selected from the group consisting of hydrogen and lower alkyl radical.

2. A compound of the formula

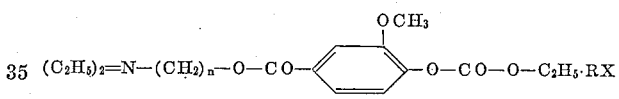

wherein n is either 4 or 6 and X represents a halogen atom, while R is selected from the group consisting of hydrogen and lower alkyl radical.

3. A compound of the formula

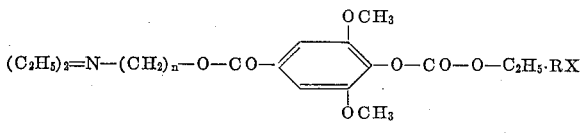

wherein n is either 4 or 6 and X represents a halogen atom, while R is selected from the group consisting of hydrogen and lower alkyl radical.

References Cited by the Examiner

UNITED STATES PATENTS

| | | | |
|---|---|---|---|
| 2,404,691 | 7/1946 | Christiansen | 260—473 |
| 2,694,069 | 11/1954 | Picha | 260—473 X |
| 2,784,141 | 3/1957 | Jacobsen | 260—473 X |
| 2,797,233 | 6/1957 | Lott et al. | 260—473 |
| 2,816,133 | 12/1957 | Campbell | 260—473 |
| 2,852,520 | 9/1958 | Robinson | 167—65 |
| 3,091,630 | 5/1963 | Davis | 260—473 |

OTHER REFERENCES

Burger, Medicinal Chemistry, page 497, last paragraph in column 1; 499, first full paragraph in column 2; 509 and 511 (1960).

Wagner et al., Synthetic Organic Chemistry, pages 481–2 (1953).

LORRAINE A. WEINBERGER, *Primary Examiner.*

LEON ZITVER, *Examiner.*

S. B. WILLIAMS, M. S. JAROSZ, *Assistant Examiners.*